(12) United States Patent
Cheng et al.

(10) Patent No.: US 7,990,097 B2
(45) Date of Patent: Aug. 2, 2011

(54) POWER CONVERSION SYSTEM AND METHOD FOR ACTIVE DAMPING OF COMMON MODE RESONANCE

(75) Inventors: Zhongyuan Cheng, Cambridge (CA); Navid Zargari, Cambridge (CA); Yuan Xiao, Kitchener (CA); Manish Pande, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 332 days.

(21) Appl. No.: 12/240,533

(22) Filed: Sep. 29, 2008

(65) Prior Publication Data

US 2010/0080028 A1    Apr. 1, 2010

(51) Int. Cl.
*H02J 3/36* (2006.01)
*H02P 27/04* (2006.01)

(52) U.S. Cl. ............ 318/800; 318/801; 363/34; 363/35; 363/37

(58) Field of Classification Search .................. 318/700, 318/400.01, 400.07, 798, 800, 801, 803; 363/34, 35, 37, 89, 97, 98, 127, 131, 135, 363/137, 138
See application file for complete search history.

(56) References Cited

U.S. PATENT DOCUMENTS

| | | | |
|---|---|---|---|
| 4,937,719 A * | 6/1990 | Yamada et al. | 363/39 |
| 5,343,381 A * | 8/1994 | Bolduc et al. | 363/47 |
| 6,166,929 A | 12/2000 | Ma et al. | |
| 6,269,010 B1 * | 7/2001 | Ma et al. | 363/35 |
| 6,842,351 B2 * | 1/2005 | Gauthier et al. | 363/39 |
| 6,934,167 B2 * | 8/2005 | Jang et al. | 363/21.02 |
| 7,274,576 B1 | 9/2007 | Zargari et al. | |
| 7,606,052 B2 * | 10/2009 | Akagi | 363/40 |

* cited by examiner

*Primary Examiner* — Eduardo Colon-Santana
(74) *Attorney, Agent, or Firm* — Fay Sharpe LLP; Alexander R. Kuszewski; John M. Miller

(57) ABSTRACT

Power conversion systems and methods are presented for damping common mode resonance, in which inverter or rectifier switching control signals are selectively modified according to a damping resistance current value computed using a predetermined virtual damping resistance value in parallel with an output or input capacitor and a measured output or input voltage value to mitigate or reduce common mode resonance in the converter.

31 Claims, 8 Drawing Sheets

POWER CONVERSION SYSTEM AND METHOD FOR ACTIVE DAMPING OF COMMON MODE RESONANCE

FIELD OF THE INVENTION

The present invention relates generally to electrical power conversion and more particularly to current source converter-based or voltage source converter based drive systems.

BACKGROUND OF THE INVENTION

Power conversion systems are used to convert input power from one form and/or level, whether AC or DC, to another (AC or DC) in a large variety of applications. One example is a pulse width modulated (PWM) current source converter used in high-power motor drives with a switching rectifier with AC input power being selectively switched to create a DC output bus voltage from which a load is driven. Power converters may include multiple stages for different types of conversion applications, such as AC/DC/AC drives for electric motors, in which input AC power of a given frequency and voltage is first converted to a DC bus, with a second stage selectively switching the DC bus power to create single or multi-phase AC output power of variable voltage and/or frequency. This type of converter is often referred to as a variable frequency drive (VFD) and is particularly useful in driving electric motors in industrial applications requiring variable speed control with varying motor load situations. Power converters often include output neutral nodes and neutrals associated with input circuits or intermediate DC link circuits, and common mode voltages may appear due to the switching action of the rectifiers and inverters used to convert input power to output (load) power. High common mode voltages can damage converter components and may cause motor failure because of insulation failure or bearing currents. A common mode choke can be employed to absorb common mode voltages, where the input side line neutral and the neutral of the motor load are connected to form a loop consisting of line side capacitance, a rectifier circuit, the link choke, an output inverter and the motor side capacitance. The high impedance of the CM choke results in a low amplitude common mode current flow through the loop, ideally with most of common mode voltage dropped across the link choke so that the neutral points do not see large common mode voltages. However, the energy storage components in the common mode loop form a resonance, which can be excited by the back emf of the motor operating at certain speeds leading to excessive oscillatory current thru the common mode choke, causing insulation or thermal failure associated with high peak voltage or magnetic saturation in the choke. In the past, common mode resonance was addressed by connecting the output neutral to the input or intermediate circuit neutral node to add a damping resistance to the resonant loop. The added resistor(s), however, must be high wattage devices and negatively impact the cost, size and reliability of the power converter. Thus, there is a need for improved power conversion systems and techniques by which the adverse effects of common mode resonance can be addressed without the additional cost and space required by damping resistors.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The present disclosure presents power conversion systems and methods for damping common mode resonance in which special inverter or rectifier switching is employed to mimic the presence of one or more virtual resistors connected in parallel with the output or input capacitor(s), where the active damping operation can in certain implementations be selectively switched on according to one or more triggering events to avoid or mitigate excessive common mode resonance currents and the adverse affects associated therewith in operation of the power conversion system.

In accordance with one or more aspects of the present disclosure, a power conversion system is provided, including an input with capacitor(s) and a neutral node, a switching rectifier connected to the input, a DC intermediate circuit and a switching inverter driving an output load through an output unit including one or more output capacitors coupled between the load and an output neutral node. The output neutral node is connected to the neutral node of the input or of the intermediate DC circuit. The inverter is operated according to control signals from a switch control system to convert DC power to provide the output power to the load, and a feedback system provides feedback values indicating of one or more electrical conditions at the input, the DC circuit, and/or the output. The switch control system includes a common mode resonance damping (CMRD) component that computes a damping resistance current value associated with a predetermined resistance value representing a virtual resistor or resistors in parallel with the output or input capacitor(s), and selectively modifies the switching pattern of the inverter or rectifier control signals accordingly.

In accordance with further aspects of the disclosure, the switch control system includes a flux or speed control component and an output or capacitor current calculation component, along with an offset component to generate an offset inverter current value based on a reference stator current value from the flux/speed controller and on an output capacitor current value from the output capacitor current calculation component. In this implementation, the CMRD component includes a damping resistance current calculation component that provides a damping resistance current value based on the predetermined virtual damping resistance value and on a measured output or input voltage value, as well as a damping offset component that generates at least one damping compensated inverter or rectifier current value based on the offset inverter or rectifier current value and the damping resistance current value. The switch control system in this case provides the switching control signals to the inverter or rectifier at least partially according to the damping compensated inverter or rectifier current value. The CMRD component in certain embodiments may further include a high pass filter or a band pass filter component that filters the one damping resistance current value.

Certain embodiments, such as current source converters, may include a rectifier coupled between the input and the DC circuit to rectify AC input electrical power to provide DC electric power in the DC circuit, and the switch control system provides control signals to the rectifier based on one or more feedback values and on the damping compensated inverter current value. In such implementations, the DC circuit may include one or more DC link choke components. In other embodiments, the inverter may be a voltage source inverter and the DC circuit includes at least two capacitors connected to one another to form a link neutral node coupled to the output neutral node.

In accordance with further aspects of the disclosure, the common mode resonance damping component is selectively triggered based on at least one feedback value from the feedback system. In this regard, the damping may be triggered according to a sensed/calculated motor speed value, based on a feedback value for at least one of a neutral current, a common mode choke voltage, a common mode voltage on the output or input capacitor(s), or based on a feed forward mechanism.

Further aspects of the disclosure relate to a method of damping common mode resonance in a power converter. The method includes generating switching control signals according to a desired power converter output, operating inverter or rectifier switching devices according to the control signals to convert DC electrical power to output power or vice versa, and measuring feedback value(s) indicative of one or more electrical conditions at a converter input, a converter DC circuit, and/or a converter output. The method further includes calculating a damping resistance current value associated with a predetermined virtual damping resistance value in parallel with the output or input capacitor(s) based at least partially on a measured output or input voltage value, and selectively modifying the switching control signals according to the calculated damping resistance current value. The switching control signal generation in certain embodiments may include providing at least one reference stator current value based at least partially on at least one feedback value and on the at least one setpoint, providing at least one output capacitor current value based at least partially on the at least one feedback value and on at least one predetermined output capacitance value, and generating at least one offset inverter current value based at least partially on the reference stator and output capacitor current values. The switching signal modification may include providing the damping resistance current value according to the virtual damping resistance value and the measured output or input voltage value, and generating a damping compensated inverter or rectifier current value based at least partially on the offset inverter or rectifier current value and the damping resistance current value. The method may further include generating the switching control signals based at least partially on the feedback value(s) and on the damping compensated inverter or rectifier current value. In further aspects of the disclosure, the switching control signal modification is selectively triggered based on one or more feedback values, such as a sensed or calculated motor speed, a neutral current value, a common mode choke voltage value, the common mode component of the output or input capacitor voltage or current, etc., or the damping may be triggered by a feed forward mechanism.

Still other aspects of the disclosure provide a computer readable medium with computer-executable instructions for damping common mode resonance in a power converter. The medium includes computer-executable instructions for generating a plurality of switching control signals according to a desired power converter output, operating a plurality of switching devices of an inverter according to the switching control signals to convert DC electrical power to AC electrical power or vice versa, measuring at least one feedback value indicative of one or more electrical conditions at a converter input, a converter DC circuit, or a converter output, calculating at least one damping resistance current value associated with a predetermined virtual damping resistance value in parallel with at least one output or input capacitor based at least partially on a measured output or input voltage value, and selectively modifying at least one of the plurality of switching control signals according to the calculated damping resistance current value.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Figure 1:
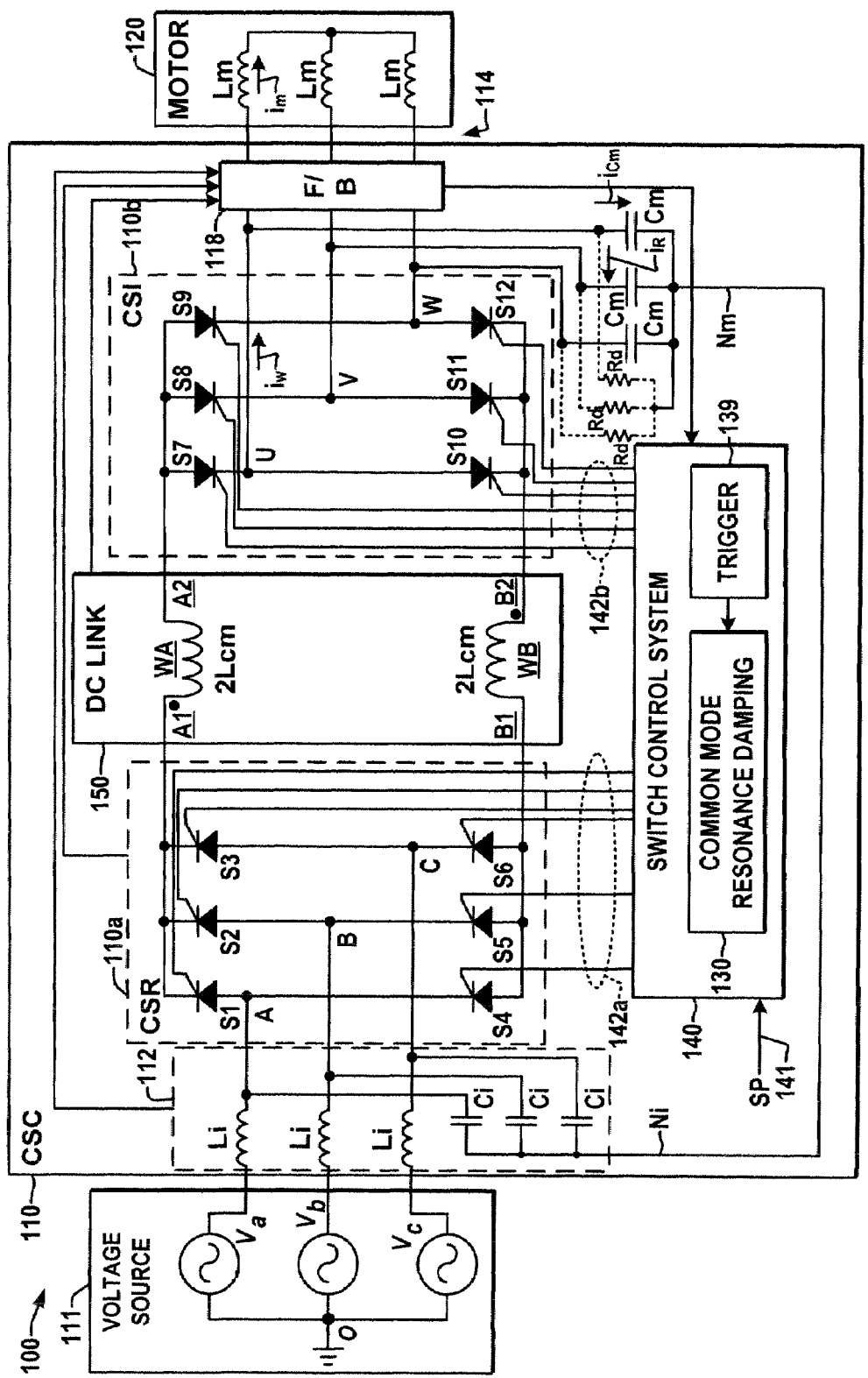
FIG. 1 is a schematic diagram illustrating an exemplary current source converter-based power conversion system with active common mode resonance damping control of a current source inverter in accordance with one or more aspects of the present disclosure.

Referring now to the figures, several embodiments or implementations of the present invention are hereinafter described in conjunction with the drawings, wherein like reference numerals are used to refer to like elements throughout, and wherein the various features are not necessarily drawn to scale. FIG. 1 illustrates an exemplary system 100 including an AC voltage source 111 providing input power to a power conversion system 110 that converts the input power to drive a motor load 120 coupled to a converter output 114. The exemplary converter 110 in this example is a current source converter (CSC) 110 with an input 112 connected to the AC power source 111. While illustrated as having a three phase input 112, other embodiments may provide a single phase AC input or may include a multiphase input adapted to receive three or more input phases. The converter 110 provides variable frequency, variable amplitude multiphase AC output power at output terminals 114 for driving an AC load, such as a motor 120 in one example, having three phase windings. The output 114 in other embodiments may provide a single phase AC output or may be of any number of phases.

In accordance with various aspects of the disclosure, the power conversion system 110 includes an intermediate DC circuit 150 including at least one storage element, in which case a DC link choke with upper and lower windings WA and WB coupled between an input rectifier 110a and an output inverter 110b. The illustrated system 110 is a current source converter, with input filtering including inductors Li in each input phase and input filter capacitors Cai coupled between the input lines A, B, C, and an input neutral node Ni. A current source rectifier (CSR) 110a and a current source inverter 110b are connected by the DC circuit 150, although voltage source inverter type systems are also contemplated (FIG. 5 and FIG. 6 below), and one or more isolation components (e.g., transformers, not shown) may be included, wherein all such alternate embodiments are contemplated as falling within the scope of the present disclosure and the appended claims. The output 114 provides output electrical power to the motor load 120, and includes output capacitors Cm coupled between the load 120 and an output neutral node Nm, with the output neutral node Nm being connected to the input neutral node Ni.

The rectifier 110a is comprised of switching devices S1-S6 coupled between the input 112 and the DC circuit 150 and operates according to a plurality of CSR switching control signals 142a from a switch control system 140. The AC input power is switched by the rectifier switches S1-S6 to create an intermediate DC bus current in the intermediate circuit 150. The inverter 110b includes a plurality of switching devices S7-S12 coupled with the DC circuit 150 and the output 114 and operative according to a plurality of switching control signals 142b to selectively convert DC power from the DC circuit 150 to provide the output power to the motor load 120.

The DC circuit 150 includes a DC choke or inductor linking the switches of the CSR 110a and the CSI 110b, and provides forward and reverse current paths between the converters 110a and 110b. The inductor of the exemplary DC circuit 150 includes a first winding WA in a forward or positive DC path having a first end A1 connected to the upper CSR switches S1-S3 and a second end A2 coupled with the upper CSI switches S7-S9, along with a second winding WB in a negative or return DC path with a first end B1 coupled to the lower CSR switches S4-S6 and a second end B2 coupled to the lower CSI switches S10-S12, although other forms and types of intermediate circuit storage elements may be employed within the scope of the present disclosure. The switching devices S1-S6 and S7-S12 may be any suitable controllable electrical switch types (e.g., IGCTS, GTOs, thyristors, IGBTS, etc.) that are controlled according to any suitable type or form of switching scheme or schemes, such as phase control, pulse width modulation, etc., in open or closed-loop fashion.

The converter 110 includes a feedback system 118 operatively coupled with the input 112, the DC circuit 150, and the output 114. The feedback system 118 provides one or more feedback values indicative of electrical conditions at the input 112, the DC circuit 150, and/or the output 114.

The switching-type converters 110a and 110b operate under control of a single switch control system 140, although separate switching control systems may be employed, for example, with interconnections and information sharing to facilitate the coordinated operation of the CSR 110a and the CSI 110b. The switch control system 140 may be provided with one or more setpoint desired values 141 and one or more feedback signals or values from a feedback system 118 by which one or more closed loop power conversion goals are achieved in normal operation. In the illustrated embodiments, for example, the switch control system 140 provides inputs for receiving a damping trigger mode signal 139 for actuation of a common mode resonance damping (CMRD) component 130, feedback signals or values from the feedback system 118, measured input values (e.g., line voltages, currents, etc.), and other information, data, etc., which may be in any suitable form such as an electrical signal, digital data, etc., and which may be received from any suitable source, such as an external network, switches, a user interface associated with the system 100, or other suitable source(s). The switch control system 140 and the damping component 130 and other components thereof may be any suitable hardware, software, firmware, logic, or combinations thereof that are adapted, configured, programmed, or otherwise operative to implement the functions illustrated and described herein.

Figure 2:
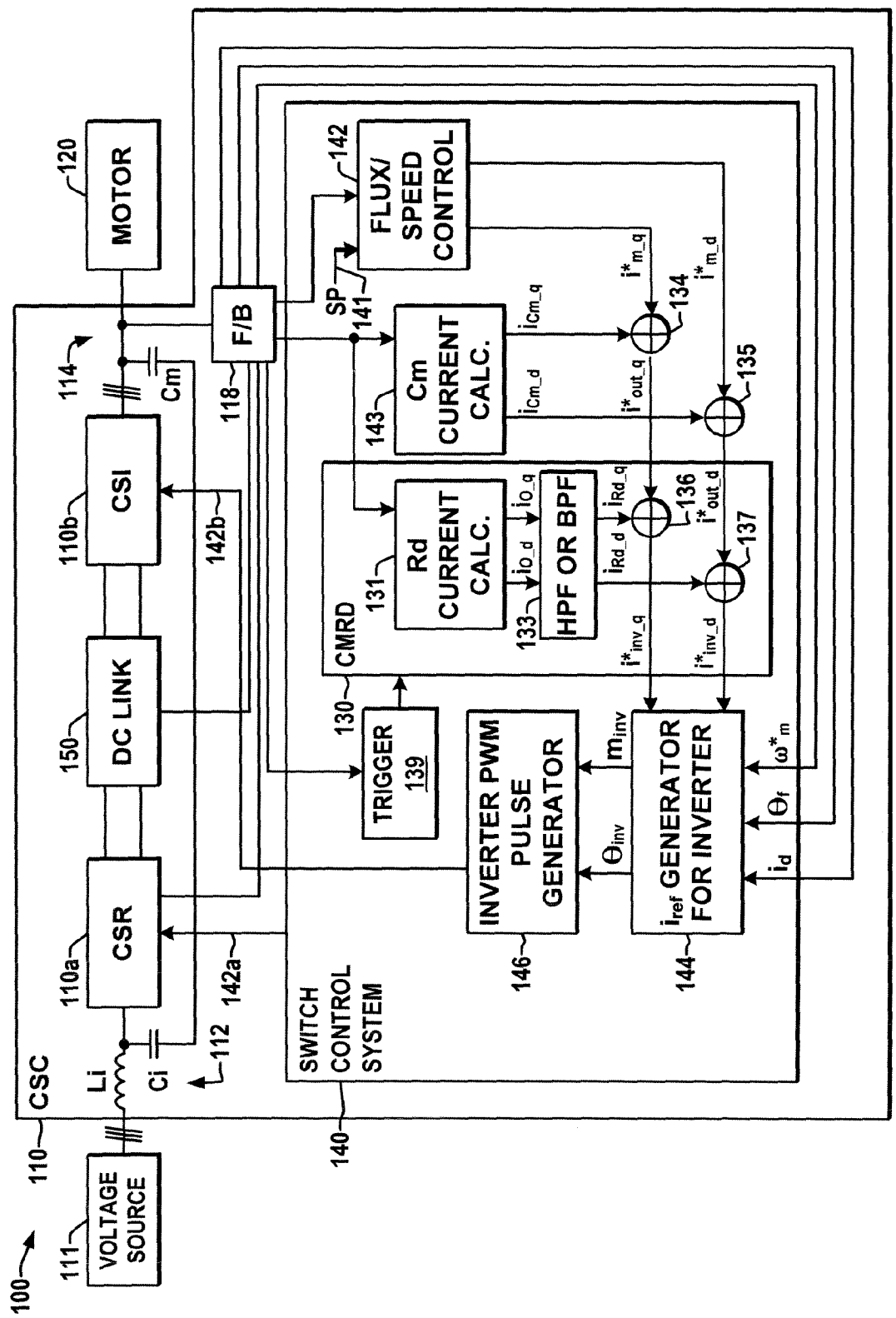
FIGS. 2 and 3 are schematic diagrams illustrating further details of the exemplary switch control system with a common mode resonance damping component for controlling the current source inverter and the current source rectifier in the system of FIG. 1 in accordance with various aspects of the disclosure.

Referring also to FIG. 2, the switch control system 140 is operatively coupled with the feedback system 118, the rectifier 110a and with the inverter 110b and includes a common mode resonance damping component 130 operative to calculate q and d-axis damping resistance current values $i_{Rd\_q}$, $i_{Rd\_d}$ associated with a predetermined virtual damping resistance value $R_d$ (shown in dashed lines in FIG. 1) in parallel with the output capacitors Cm based at least partially on an output voltage value obtained from the feedback system 118. In operation, the rectifier switching devices S1-S6 are controlled via the signals 142a to selectively couple individual ones of the input terminals A, B, and/or C with the intermediate DC circuit 150 so as to convert input multiphase electric power to DC power in the DC link 150, and the inverter switches S7-S12 are operated according to the signals 142b to selectively couple the intermediate circuit 150 to the output 114 in order to provide multiphase output power to the motor 120. In a damping mode, with the common mode resonance damping component 130 activated by the trigger 139, the switch control system 140 provides the inverter switching control signals 142b based at least partially on feedback value(s) from the feedback system 118 and on one or more damping resistance current values $i_{Rd\_q}$, and $i_{Rd\_d}$ to convert DC power from the DC circuit 150 in order to provide the output power to the load 120. Active damping is this regard is implemented by mimicking the presence of a resistor virtually connected to the output capacitors.

Figure 4:
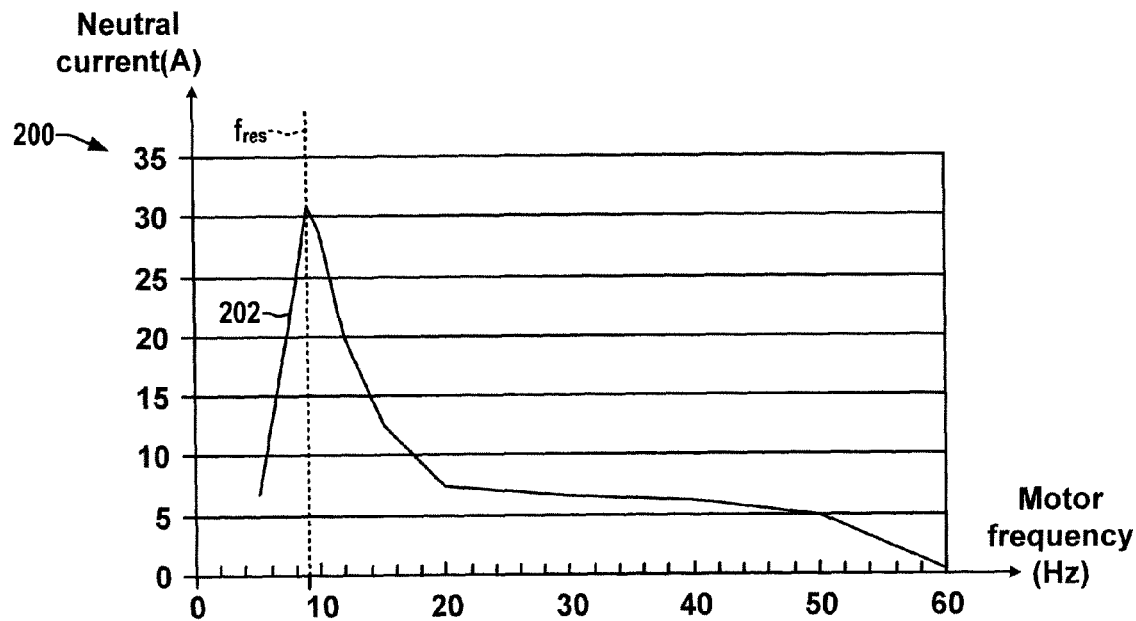
FIG. 4 is a graph illustrating an exemplary plot of neutral current vs. motor frequency showing a common mode resonance condition.

Referring also to FIG. 4, the inventors have appreciated that while the common mode link choke in the DC circuit 150 can absorbed certain amounts of common mode voltages, connection of the input and output neutral nodes Ni and Nm forms a loop including the input capacitors Ci, the rectifier 110a, the link choke, the inverter 110b, and the output capacitors Cm, and that energy storage components in the common mode loop may resonate through motor back emf excitation when the motor is driven at certain speeds. FIG. 4 depicts a graph 200 showing a neutral current vs. motor frequency graph 202 for an exemplary CSC motor drive of the form shown in FIGS. 1 and 2 with an actual neutral resistance Rn in the neutral path between the input and output neutral nodes Ni and Nm. In this example, a common mode resonant frequency $f_{res}$ is seen in the neutral current curve 202 at slightly below 10 Hz, and is below the input AC power frequency (e.g., 50 Hz or 60 Hz). In one embodiment of the converter 110, the DC link choke inductance Lcm is about 400 mH=10 pu, the output side capacitors Cm are about 0.3 pu, and the input capacitors Ci are about 0.5 pu. The common mode resonance in this case is given by the following equation (1):

$$f_{res,cm} = \frac{1}{\sqrt{LC}} = \frac{1}{\sqrt{(2L_{cm})\frac{C_m C_i}{C_m + C_i}}} = 0.5 \text{ pu}, \qquad (1)$$

which can be translated to 0.5 pu/3=0.17 pu motor speed. In this case, when the motor load 120 is operated at about 0.17 pu speed (e.g., about 10 Hz for a 60 Hz motor, or about 8 Hz for a 50 Hz motor), the resonant mode will be excited by back emf. In this type of application, moreover, the common mode resonant frequency $f_{res}$ cannot be easily shifted to a value beyond the operating speed range of the motor load 120 through simple adjustment of the values of the input and output capacitances. In this regard, the resonant motor speed is a function of the values of Lcm, Cm and Ci, but other design factors limit the adjustment of the resonant frequency to relatively narrow band. For a typical design, common mode inductance is about 10 pu, the input and output capacitors change from 0.2 pu to 0.7 pu, and typically from 0.3 pu to 0.55 pu. Thus, in this example, the resonant frequency $f_{res}$ will be in a range of about 14.1 Hz to 7.5 Hz, and typically about 11.5 Hz to 8.5 Hz for a 60 Hz motor.

Figure 3:
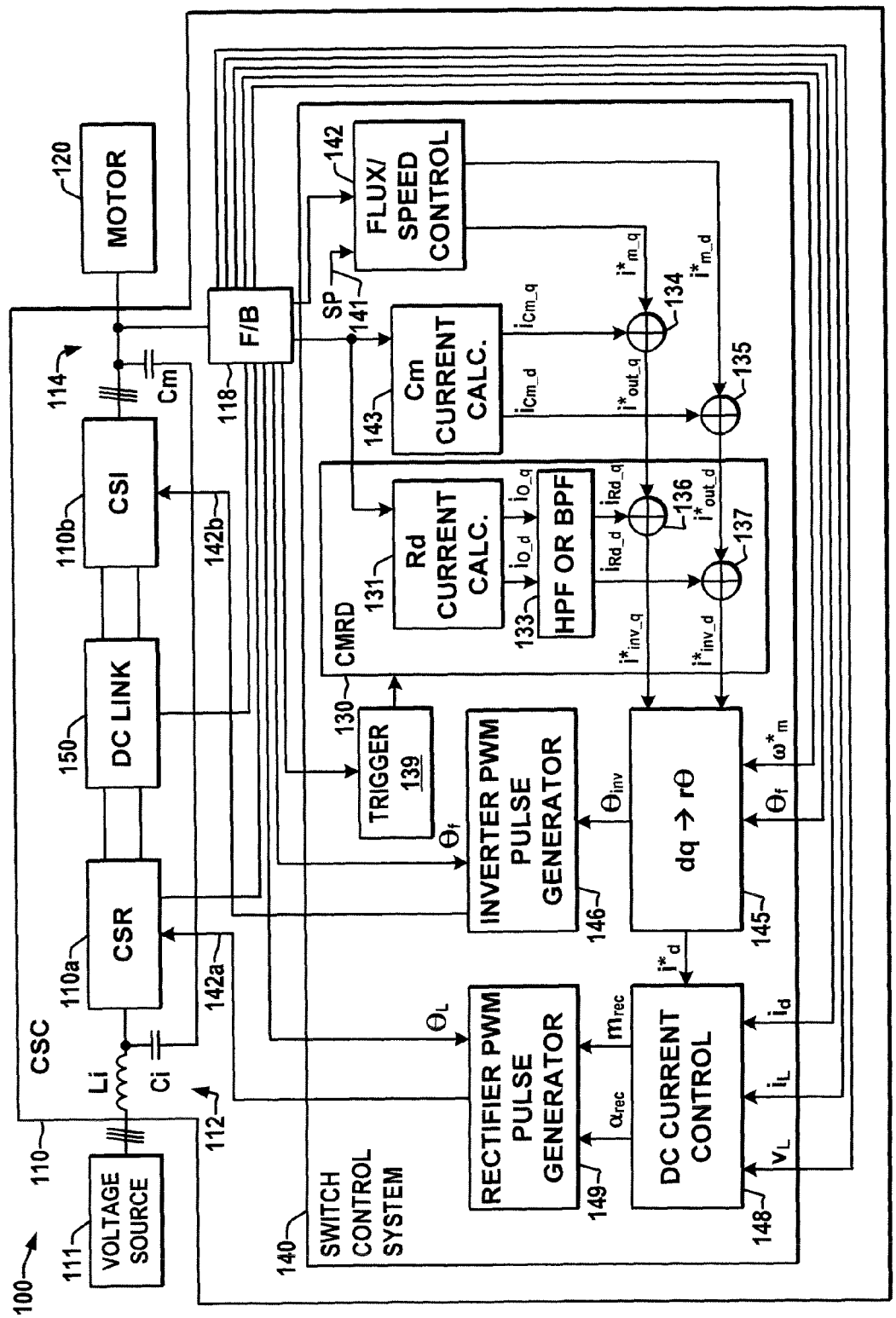

In accordance with one or more aspects of the present disclosure, the neutrals Ni and Nm are connected (without any neutral resistor), and the switch control system 140 employs the common mode resonance damping component 130 to selectively implement active damping according to a damping trigger 139 in order to damp common mode resonance. The active damping in the exemplary embodiment of FIGS. 1-3 is achieved by modifying the inverter control signal generation to apply a special gating pattern to mimic the virtual resistors Rd (FIG. 1) connected in parallel with the output capacitors Cm.

As best shown in FIG. 2, the inverter 110b is operated using modulation index control. The switch control system 140 includes a flux or speed control component 142 that provides q and d-axis reference stator current values $i^*_{m\_q}$ and $i^*_{m\_d}$ based in whole or in part on at least one feedback value from the system 118 and on at least one setpoint 141. The control system 140 also includes an output capacitor current calculation component 143 that provides q and d-axis output capacitor current values $i_{Cm\_q}$ and $i_{Cm\_d}$ based at least partially on feedback value(s) and on at least one predetermined output capacitance value representing the output capacitance Cm. In addition, the system 140 includes q and d-axis capacitor offset components 134 and 135 that generate q and d-axis offset inverter current values $i^*_{out\_q}$ and $i^*_{out\_d}$, respectively, based in whole or in part on the reference stator current values $i^*_{m\_q}$ and $i^*_{m\_d}$ and the output capacitor current values $i_{Cm\_q}$, $i_{Cm\_d}$, in this example, as summations thereof.

As shown in FIG. 2, moreover, the exemplary CMRD component 130 comprises a damping resistance current calculation component 131 that provides q and d-axis damping resistance current values $i_{Rd\_q}$ and $i_{Rd\_d}$, respectively, based at least partially on the predetermined virtual damping resistance value $R_d$ and on a measured output voltage value from the feedback system 118. The CMRD component 130 also includes q and d-axis damping offset components 136 and 137 that generate q and d-axis damping compensated inverter current values $i^*_{inv\_q}$ and $i^*_{inv\_d}$ as a summation of the offset inverter current values $i^*_{out\_q}$ and $i^*_{out\_d}$ and the damping resistance current values $i_{Rd\_q}$ and $i_{Rd\_d}$.

The switch control system 140 also includes an inverter reference current value generation component 144 that receives the damping compensated inverter current values $i^*_{inv\_q}$ and $i^*_{inv\_d}$ and various feedback values for the DC link current $i_d$, the motor angle $\theta_f$ and motor speed (frequency) $\omega^*_m$ from the feedback system 118, and provides angle and modulation index control values $\theta_{inv}$ and $m_{inv}$, respectively, by calculating the inverter current $i_w$, including its magnitude and angle with respect to the rotor flux and/or speed. These are provided to an inverter pulse width modulation (PWM) pulse generator component 146 that provides the inverter switching signals 142b to the inverter 110b.

In this manner, the switch control system 140 provides the inverter control signals 142b based at least partially on the feedback value(s) from the feedback system 118 and on the damping compensated inverter current value $i^*_{inv\_q}$ and $i^*_{inv\_d}$ when the trigger signal 139 is enabled. When the trigger 139 is not enabled, the CMRD component provides the q and d-axis offset inverter current values $i^*_{out\_q}$ and $i^*_{out\_d}$ as signals $i^*_{inv\_q}$ and $i^*_{inv\_d}$ to the reference generator 144 without modification. In the illustrated embodiments, the CMRD component 130 is selectively triggered based on at least one feedback value from the feedback system 118. In one motor drive implementation, for example, the feedback system 118 senses the motor speed (frequency), and the trigger component 139 compares this with a predetermined resonant frequency range (e.g., as described above in connection with FIG. 4) and selectively triggers the CMRD component 130 based on the sensed motor speed value from the feedback system 118. In another possible implementation, the trigger component 139 triggers the CMRD component 130 based on a feedback value for at least neutral current, common mode choke voltage, and/or output (common mode) capacitor voltage. Still other implementations include the trigger component 139 selectively triggering the CMRD component 131 based on a feed forward mechanism (not shown).

In the embodiment of FIG. 2, moreover, the exemplary CMRD component 130 also includes a high pass or band pass filter component 133 operative to received q and d-axis offset values $i_{O\_q}$ and $i_{O\_d}$ from the component 131 and to filter these to provide the damping resistance current values $i_{Rd\_q}$ and $i_{Rd\_d}$. In this manner, the CMRD component 130 is selectively operable to calculate and filter the virtual resistor current and to decompose this as $i_{Rd\_d}$ and $i_{Rd\_q}$, which are used by the reference current generator 144 for controlling the inverter 110b. The reference current generator 144 also receives the feedback $i_d$, the motor reference speed $\omega^*_m$, and other angle information such as rotor flux angle feedback $\theta_f$ in case of rotor field oriented control algorithms. The output of the reference current generator 144 in this example is inverter modulation index $m_{inv}$ and inverter firing angle $\theta_{inv}$, which are fed to the PWM component 146 to produce firing pulse signals 142b for controlling the inverter 110b, for instance, using any suitable pulse width modulation technique, such as space vector modulation (SVM), selective harmonic elimination (SHE) or other modulation technique with modulation index control.

The exemplary damping resistance current calculation component 131 calculates the virtual current according to the following equation (2):

$$i_{Rd} = \frac{v_m}{R_d}, \qquad (2)$$

where a predetermined value $R_d$ can be selected to achieve adequate damping without causing instability of the control based on the known values of the resonant loop in the converter 110. In vector control algorithms, the virtual current is resolved as q and d-axis components according to the following equations (3) and (4):

$$i_{Rd\_q} = \frac{v_{m\_q}}{R_d}, \quad (3)$$

and $$i_{Rd\_d} = \frac{v_{m\_d}}{R_d}, \quad (4)$$

where $v_{m\_q}$ and $V_{m\_d}$ are the q and d-axis components of the stator voltage feedback of the motor 120. The high pass or band pass filter 133 is used to detect the common mode resonant current through the output capacitors Cm, where the fundamental output of the inverter 110b will not see the virtual resistors Rd. In one implementation, the high pass filter cutoff frequency is set to a low value to pick up the common mode resonant harmonics, and this may alternatively be implemented as a band pass filter with proper cutoff frequencies.

Referring now to FIG. 3, the rectifier 110a is operated to control DC current $i_d$ in the DC circuit 150 and may also implement power factor control. FIG. 3 illustrates another embodiment in which the inverter 110b is operated without modulation index control. For this exemplary current source drive 110, the magnitude and frequency of the output current are controlled by the rectifier 110a and inverter 110b separately, with the output magnitude controlled by the DC current $i_d$ in the circuit 150 via the rectifier control signals 142a using firing angle or modulation index control techniques. The inverter 110b, in turn, controls the output frequency by changing the frequency $\theta_{inv}$ of the inverter reference current as provided by a dq→θ component 145, with the inverter 110b operated at a generally fixed modulation index value. As shown in FIG. 3, the inverter reference current is also modified by adding the virtual damping resistance current values $i_{Rd\_q}$ and $i_{Rd\_d}$ from the component 131. The resulting damped inverter current components $i^*_{inv\_q}$ and $i^*_{inv\_d}$ are provided the dq to rθ converter 145 to obtain the modulus and argument. The motor flux angle value θf is added by the PWM generator 146 to the inverter reference current $\theta_{inv}$ to create the gating pulse control signals 142b for the inverter 110b which employs a generally fixed modulation index. The modulus $i^*_d$ is provided by the converter 145 to a DC current control loop component 148 which generates the rectifier firing angle $\alpha_{rec}$ and modulation index $m_{rec}$, which are used by a rectifier PWM pulse generator component to create gating pulse control signals 142a for the rectifier 110a. In the examples of FIGS. 2 and 3 and in other control configurations of a power converter, active damping can be implemented as described above or otherwise (selectively or always) by calculating a virtual current through the virtual resistor and adding the virtual current to the reference current, with an optional high pass or band pass filter 133 to remove harmonic components from the virtual current.

Figure 5:
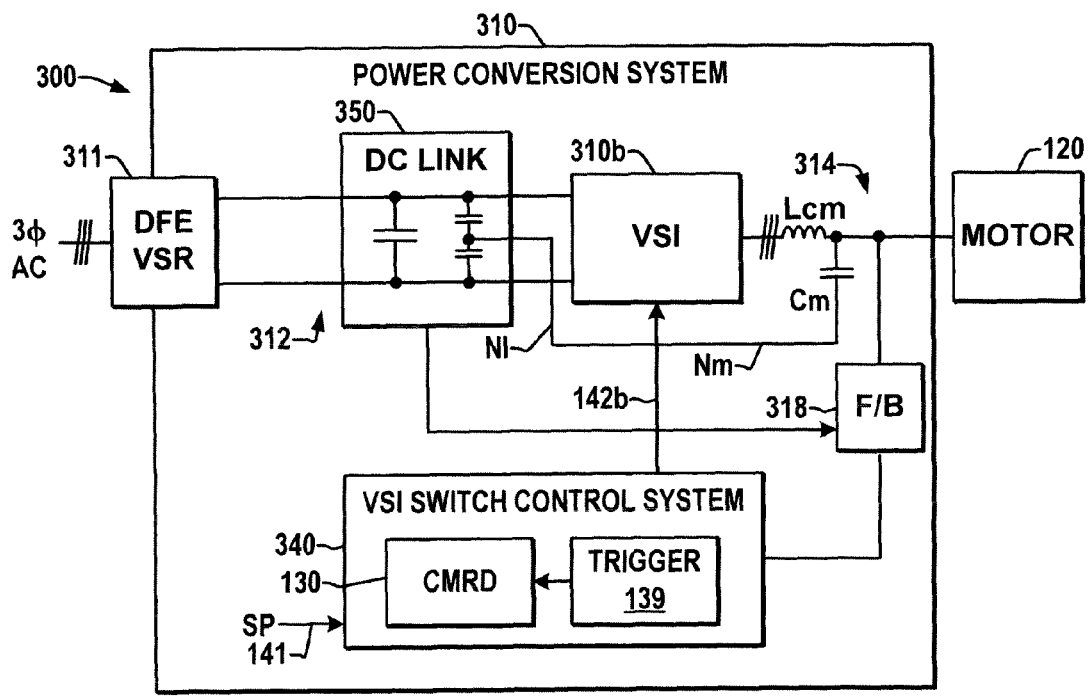
FIG. 5 is a schematic diagram illustrating an exemplary DFE (diode front end) voltage source converter including a common mode resonance damping control component in accordance with various aspects of the present disclosure.

Referring now to another system 300 in FIG. 5, another embodiment is illustrated in which the above described active common mode resonance damping techniques are employed in a voltage source converter 310 having a DC link circuit 350 powered by a DFE DC source 311 (external or an internal rectifier as described above) providing an input 312 to the DC circuit 350. The DC power in the circuit 350 is converter to output AC power by a voltage source inverter (VSI) 310b that includes a plurality of switching devices (not shown) operated according to inverter switching control signals 142b from a VSI switch control system 340 based at least partially on a setpoint 141 and feedback value(s) from a feedback system 318 to provide power to a motor load 120 coupled to the converter output 314. The control system 340 includes a triggered CMRD system 130 as described above to selectively modify the VSI switching control signals 142b to virtualize a resonance damping resistance across the output capacitor(s) Cm in the manner described above. In this implementation, the output neutral Nm is connected to a link circuit neutral node NI created by all or part of the DC link capacitors being split into halves to create the neutral Ni which is coupled to the output neutral Nm to form a path for common mode current. This architecture may optionally include one or more common mode choke(s) in the loop to limit the neutral current (not shown). The VSI 310b, moreover, may include output inductors or reactors in the output lines, and the common mode inductance and the output reactance may be integrated in certain implementations.

Figure 6:
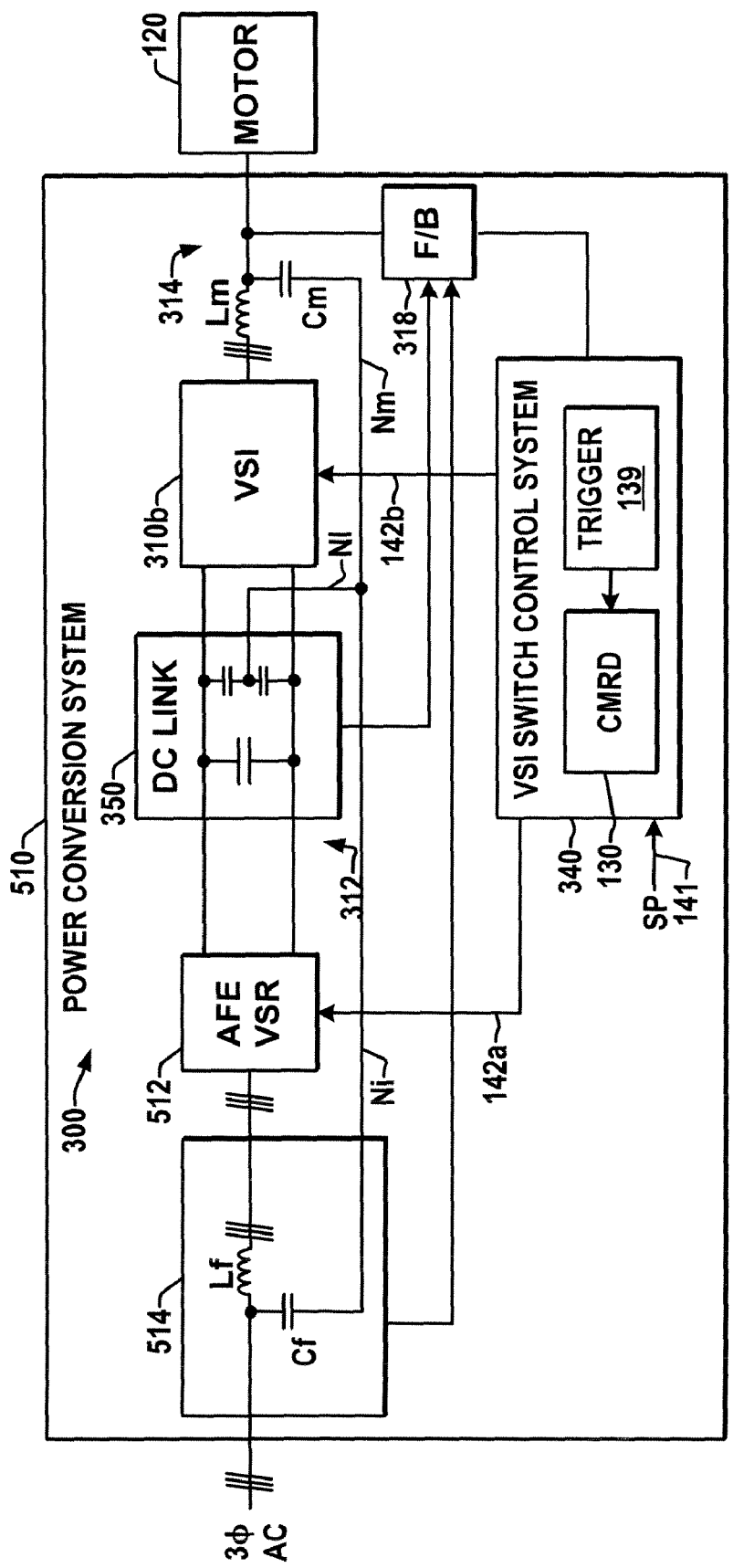
FIG. 6 is a schematic diagram illustrating an exemplary AFE (active front end) voltage source converter based converter system with active common mode resonance damping in accordance with further aspects of the present disclosure.

FIG. 6 illustrates another embodiment of a voltage source-type power conversion system 510 including a common mode resonance damping system 130 operable generally as described above in accordance with the present disclosure. In this example, the AC/DC converter 512 is an active front-end, voltage source rectifier (AFE VSR) having switching devices (e.g., semiconductor switches such as SCR, GTO, GCT, IGCT, IGBT, IEGT, MOSFET and antiparallel diodes, etc.) operable according to rectifier switching control signals 142a from the switch control system 340. In this embodiment, moreover, an input filter 514 receives the input AC power and includes line reactor(s) and capacitor(s) connected for each phase between the multi-phase power supply and the VSR 512. As shown in FIG. 6, the input neutral node Ni, the link neutral NI, and the output (motor) neutral Nm are coupled together, although other embodiments are possible in which a common mode loop is formed by connection of any two of these neural nodes Ni, NI and Nm together. The active damping is provided for damping any common mode resonance, optionally being selectively triggered via a trigger component 139 as described above to selectively modify operation of the switch control system to adjust the switching control signals 142 provided to either or both of the inverter 310b and/or the VSR 512 in order to simulate and compensate for one or more virtual damping resistors Rd in parallel with the output capacitor(s) Cm or the input filter capacitor(s) Cf.

Figure 7:
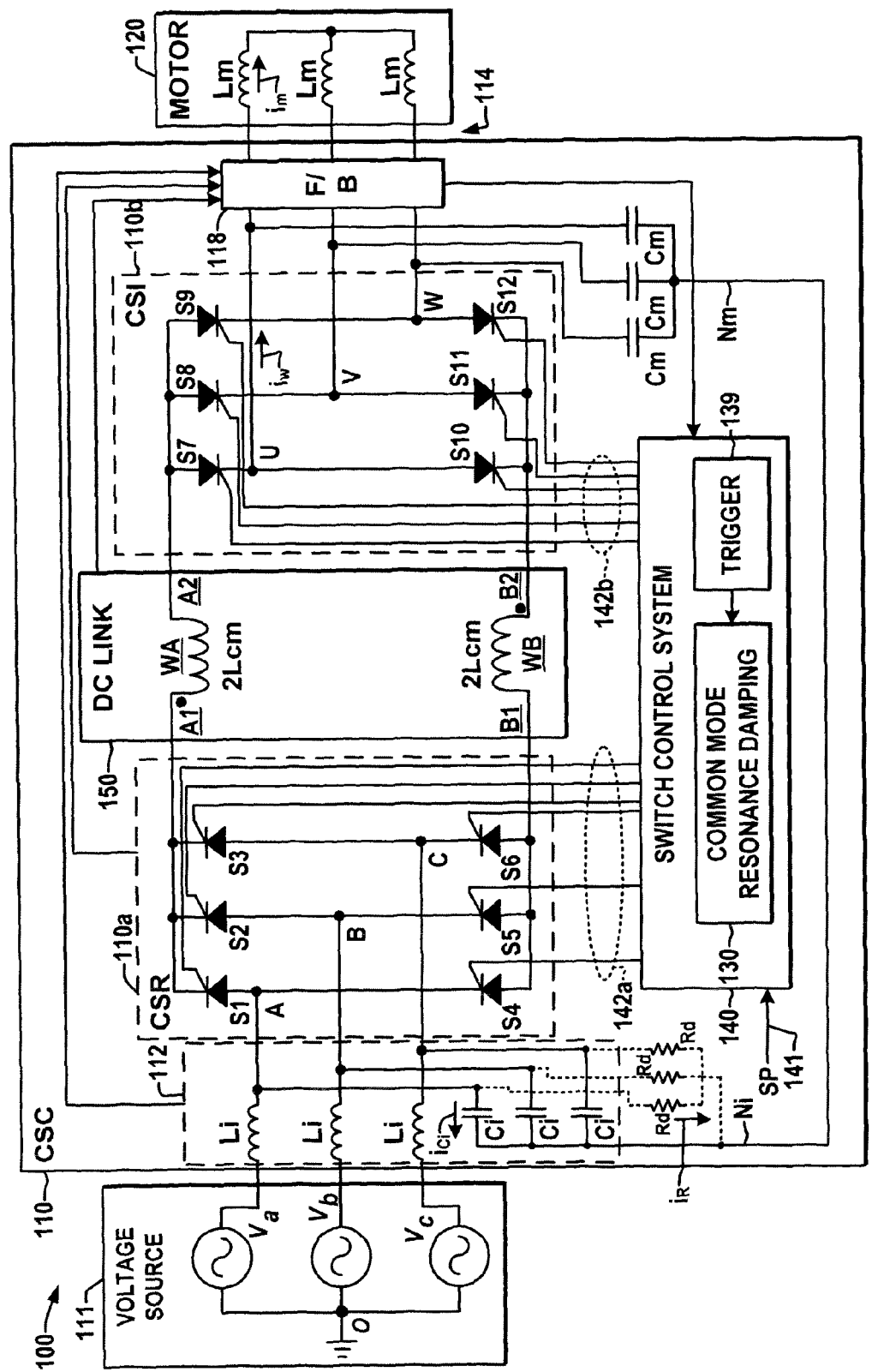
FIG. 7 is a schematic diagram illustrating yet another exemplary power conversion system with active common mode resonance damping based on virtual input resistances in accordance with the present disclosure.
Figure 8:
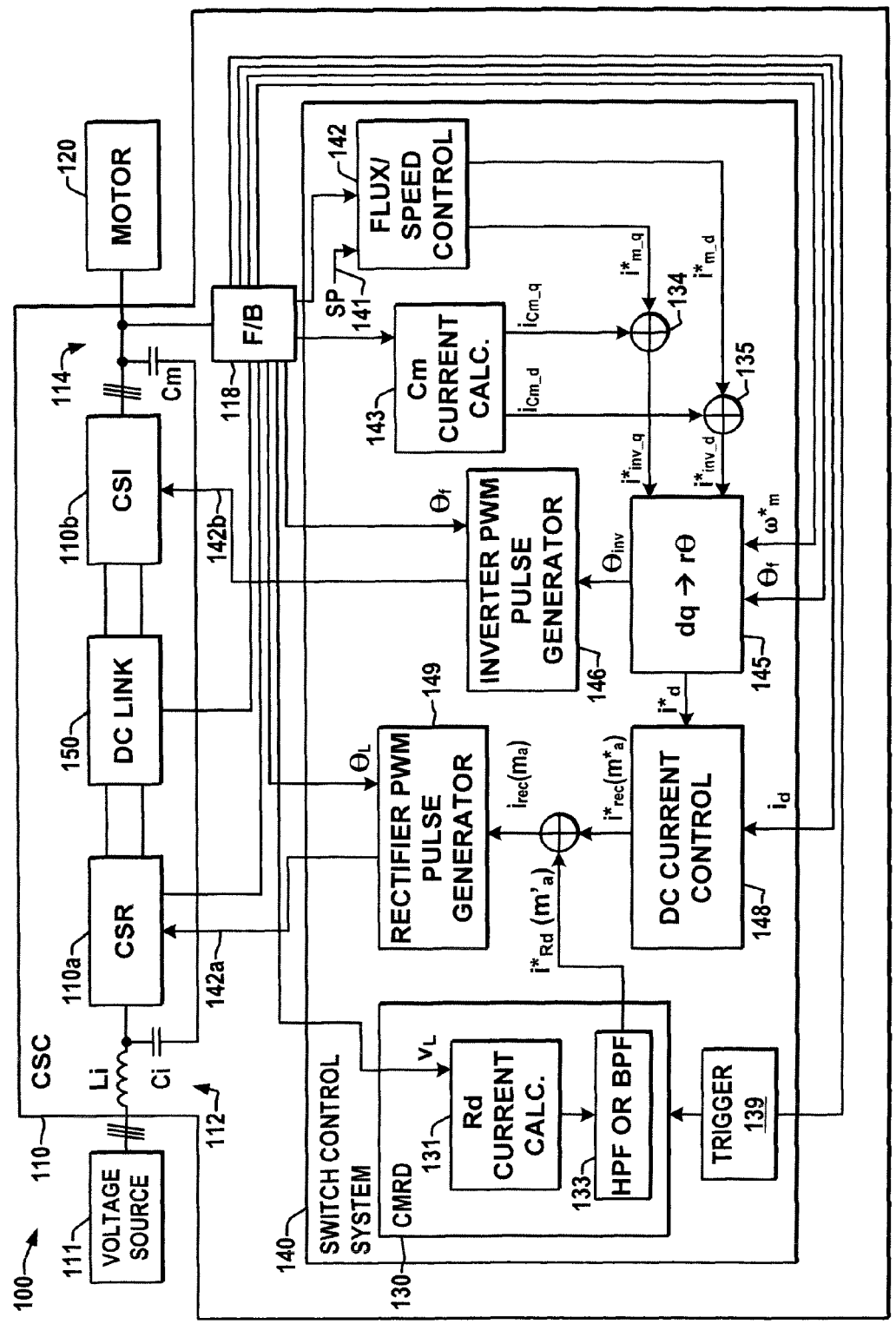
FIG. 8 is a schematic diagram illustrating still another exemplary power conversion system with active common mode resonance damping to selectively modify switching rectifier operation in accordance with various aspects of the present disclosure.

Referring now to FIGS. 7 and 8, FIG. 7 illustrates another example of active damping in by virtualizing one or more damping resistors Rd connected parallel to the input capacitors Ci, in which the rectifier gating control signals 142a and/or the inverter signals 142b are selectively modified to account for the addition of damping current. FIG. 8 illustrates further details of an exemplary selective rectifier switching control signal modification technique in the system 110 of FIG. 7 to mimic the virtual resistors Rd connected to the input capacitors Ci. The inverter 110b is controlled in similar fashion to that of FIG. 3 above without resonance damping signal modification (e.g., the signals $i^*_{inv\_q}$ and $i^*_{inv\_d}$ are not compensated by damping current adjustments). In the example of FIG. 8, rather, the control of the rectifier 110a is selectively modified to include the CMDR adjustment via the Rd current calculation component 131 and the optional high-pass or band-pass filtering via component 133. In normal operation, the DC current controller 148 generates a reference current $i^*_{rec}$ for the rectifier 110a. The rectifier PWM pulse generator 149, which may be any form of pulse-width-modulation system (e.g., SVM, SHE, sinusoidal PWM (SPWM), etc.), receives a reference $i_{rec}$ and provides the rectifier switching control signals 142a accordingly. When the CMDR system 130 is triggered via the trigger component 139 (e.g., according to one or more of the above described trigger conditions), the virtual damping resistor current is calculated by the CMRD system 130 based at least partially on the voltage feedback $V_L$ from the feedback system 118 (e.g., the voltage across the input filter capacitors Ci), and this is filtered via the component 133 to provide a damping component $i^*_{Rd}$. This value is added to $i^*_{rec}$ to obtain a damping compensated rectifier reference current $i_{rec}$, which is used to control the rectifier PWM pulse generator 149 for generating the switching control signals 142a for the rectifier 110a. In this regard, both $i^*_{rec}$ and $i^*_{Rd}$ can be normalized by the DC reference current value $i^*_d$ from the converter 145, with the ratios being amplitude modulation indices $m^*_a$ and $m'_a$, where the summation of $m^*_a$ and $m'_a$ provides a modified modulation index $m_a$ for the rectifier 110a.

Figure 9:
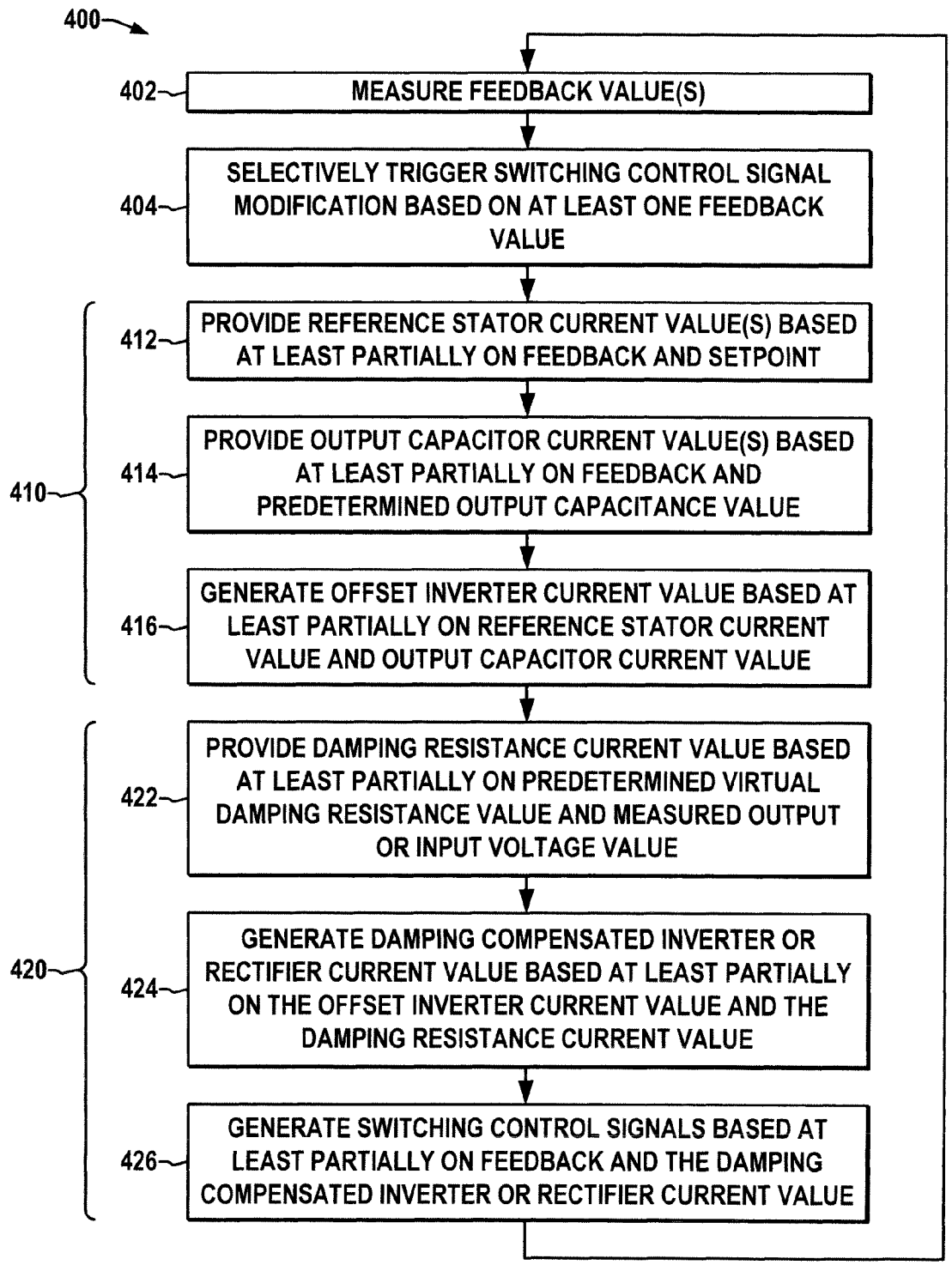
FIG. 9 is a flow diagram illustrating an exemplary method of active common mode resonance damping in accordance with further aspects of the present disclosure.

Referring now to FIG. 9, further aspects of the disclosure provide a method and computer-readable media with computer-executable instructions for damping common mode resonance in a power converter. FIG. 6 illustrates on such exemplary method 400 in accordance with the present disclosure. While the method 400 is illustrated and described below in the form of a series of acts or events, it will be appreciated that the various methods of the invention are not limited by the illustrated ordering of such acts or events. In this regard, except as specifically provided hereinafter, some acts or events may occur in different order and/or concurrently with other acts or events apart from those illustrated and described herein in accordance with the invention. It is further noted that not all illustrated steps may be required to implement a process or method in accordance with the present invention, and one or more such acts may be combined. The illustrated methods and other methods of the invention may be implemented in hardware, software, or combinations thereof, in order to provide the common mode resonance damping functionality described herein, and may be employed in any power conversion system including but not limited to the above illustrated systems 110 and 310, wherein the invention is not limited to the specific applications and embodiments illustrated and described herein.

The method 400 begins at 402 with measurement of one or more feedback values, and the switching control modification for active common mode resonance damping is selectively triggered at 404 based on one or more feedback values. At 410, plurality of switching control signals are generated according to a desired power converter output and at 420 one or more of the switching control signals are selectively modified according to a calculated damping resistance current value. In the method 400, a plurality of inverter or rectifier switching devices (e.g., switches S7-S12 or S1-S6 of the converter system 110 above) are controlled or operated according to the switching control signals to convert DC electrical power to provide output power to a load or to converter AC input power to DC power in the DC link circuit, and at least one damping resistance current value (e.g., values $i_{Rd\_q}$, $i_{Rd\_d}$, or $i^*_{Rd}$ above) are calculated based at least partially on a measured output voltage value. In the exemplary method 400, the switching control signal generation includes providing at least one reference stator current value at 412 (e.g., $i^*_{m\_q}$, $i^*_{m\_d}$) based at least partially on one or more feedback values and on one or more setpoint values (e.g., setpoint 141 above), and providing at least one output capacitor current value at 414 (e.g., $i_{Cm\_q}$, $i_{Cm\_d}$ above) based at least partially on the at least one feedback value and on at least one predetermined output capacitance value. At 416, one or more offset inverter current values are generated (e.g., $i^*_{out\_q}$, $i^*_{out\_d}$ above) based at least partially on the reference stator current value and the output capacitor current value, such as by adding these as in the above switch control system 140.

The selective modification of the switching control signals at 420 includes providing one or more damping resistance current values (e.g., $i_{Rd\_q}$, $i_{Rd\_d}$ or $i'_{Rd}$) at 422 based at least partially on the predetermined virtual damping resistance value $R_d$ and on a measured output or input voltage value, and generating at least one damping compensated inverter current value or rectifier current value, firing angle or modulation index (e.g., $i^*_{inv\_q}$, $i^*_{inv\_d}$ or $\alpha_{rec}$, $i_{rec}$, $m_{rec}$ above) at 424 based at least partially on the offset inverter current value or rectifier current value and at least one damping resistance current value. The modified switching control signals 142b are provided at 426 based at least partially on the feedback value(s) and on the at least one damping compensated inverter or rectifier current value.

In accordance with further aspects of the disclosure, the above described methods and active damping techniques may be embodied as computer-readable media including computer-executable instructions for performing the above described method steps, with intermediate and final values being stored in a memory, such as electronic memory situated in the exemplary switch control system 140 or elsewhere in the power conversion system 110 or in a memory operatively coupled therewith.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A power conversion system, comprising:
   an input operative to receive input electrical power;
   a DC circuit including at least one storage element;
   an output providing output electrical power to a load, the output including at least one output capacitor coupled between the load and an output neutral node, the output neutral node being connected to one of a neutral node of the input and a neutral node of the DC circuit;
   an inverter comprising a plurality of switching devices coupled with the DC circuit and the output and operative according to a plurality of switching control signals to selectively convert DC power from the DC circuit to provide the output power to the load;
   a feedback system operatively coupled with at least one of the input, the DC circuit, and the output and providing at least one feedback value indicative of one or more electrical conditions at the at least one of the input, the DC circuit, and the output;

a switch control system operatively coupled with the feedback system and with the inverter and/or rectifier, the switch control system including a common mode resonance damping component operative to calculate at least one damping resistance current value associated with a predetermined virtual damping resistance value in parallel with the at least one output or input capacitor based at least partially on an output or input voltage value obtained from the feedback system, the switch control system providing the switching control signals to the inverter or rectifier to convert DC power from the DC circuit to provide the output power to the load or convert AC power from the input to DC power in the DC circuit, based at least partially on the at least one feedback value from the feedback system and on the at least one damping resistance current value, wherein the switch control system comprises:

a flux or speed control component that provides at least one reference stator current value based at least partially on the at least one feedback value and on at least one setpoint, an output capacitor current calculation component that provides at least one output capacitor current value based at least partially on the at least one feedback value and on at least one predetermined output capacitance value, and at least one capacitor offset component that generates at least one offset inverter current value based at least partially on the at least one reference stator current value and the at least one output capacitor current value;

wherein the common mode resonance damping component comprises:

a damping resistance current calculation component that provides the at least one damping resistance current value based at least partially on the predetermined virtual damping resistance value and on the output or input voltage value, and at least one damping offset component that generates at least one damping compensated inverter or rectifier current value based at least partially on the offset inverter or rectifier current value and the at least one damping resistance current value; and wherein the switch control system provides the switching control signals to the inverter or rectifier based at least partially on the at least one feedback value from the feedback system and on the at least one damping compensated inverter or rectifier current value.

2. The power conversion system of claim 1, further comprising a rectifier comprising a plurality of switching devices coupled between the input and the DC circuit and operative according to a plurality of CSR switching control signals from the switch control system to rectify AC input electrical power to provide DC electric power in the DC circuit;

wherein the switch control system provides the switching control signals to the rectifier based at least partially on the at least one feedback value from the feedback system and on the at least one damping compensated inverter current value.

3. The power conversion system of claim 1, further comprising a rectifier comprising a plurality of switching devices coupled between the input and the DC circuit and operative according to a plurality of CSR switching control signals from the switch control system to rectify AC input electrical power to provide DC electric power in the DC circuit;

wherein the switch control system provides the switching control signals to the rectifier based at least partially on the at least one feedback value from the feedback system and on the at least one damping compensated rectifier current value.

4. The power conversion system of claim 1, wherein the common mode resonance damping component further comprises a high pass or band pass filter component operative to filter the at least one damping resistance current value.

5. The power conversion system of claim 1, further comprising a rectifier comprising a plurality of switching devices coupled between the input and the DC circuit and operative according to a plurality of CSR switching control signals from the switch control system to rectify AC input electrical power to provide DC electric power in the DC circuit;

wherein the switch control system provides the switching control signals to the rectifier based at least partially on the at least one feedback value from the feedback system and on the at least one damping resistance current value.

6. The power conversion system of claim 1, wherein the inverter is a current source inverter and wherein the DC circuit includes at least one DC link choke.

7. The power conversion system of claim 1, wherein the inverter is a voltage source inverter and wherein the DC circuit includes at least two capacitors connected to one another to form a link neutral node coupled to the output neutral node and a common mode choke in the input, DC circuit or output.

8. The power conversion system of claim 1, wherein the inverter is a voltage source inverter and the rectifier is a diode front end voltage source rectifier and wherein the DC circuit includes at least two capacitors connected to one another to form a link neutral node coupled to the output neutral node.

9. The power conversion system of claim 1, wherein the inverter is a voltage source inverter and the rectifier is an active front end voltage source rectifier and wherein the DC circuit includes at least two capacitors connected to one another to form a link neutral node coupled to the output neutral node.

10. The power conversion system of claim 1, wherein the inverter is a voltage source inverter and the rectifier is an active front end voltage source rectifier coupled to an input with an input neutral node and wherein the DC circuit includes at least two capacitors connected to one another to form a link neutral node coupled to the input neutral node.

11. The power conversion system of claim 1, wherein the inverter is a voltage source inverter and the rectifier is an active front end voltage source rectifier coupled to an input with an input neutral node and wherein the DC circuit includes at least two capacitors connected to one another to form a link neutral node coupled to the input and output neutral nodes.

12. The power conversion system of claim 1, wherein the inverter is a voltage source inverter and the rectifier is an active front end voltage source rectifier and wherein the input neutral node is coupled to the output neutral node.

13. The power conversion system of claim 1, further comprising a rectifier comprising a plurality of switching devices coupled between the input and the DC circuit and operative according to a plurality of CSR switching control signals from the switch control system to rectify AC input electrical power to provide DC electric power in the DC circuit; wherein the inverter is a current source inverter; and wherein the output neutral node is connected to an input neutral of the input.

14. The power conversion system of claim 1, wherein the common mode resonance damping component is selectively triggered based on at least one feedback value from the feedback system.

15. The power conversion system of claim 14, wherein the output is operatively coupled to a motor load, wherein the feedback system is operative to sense a motor speed, and wherein the common mode resonance damping component is selectively triggered based on a sensed motor speed value from the feedback system.

16. The power conversion system of claim 14, wherein the output is operatively coupled to a motor load, wherein the feedback system is operative to sense a motor stator voltage and its frequency to estimate the rotor speed, and wherein the common mode resonance damping component is selectively triggered based on the calculated motor speed value.

17. The power conversion system of claim 14, wherein the common mode resonance damping component is selectively triggered based on a feedback value for at least one of a neutral current, a common mode choke voltage, or a common mode component of a capacitor voltage.

18. The power conversion system of claim 14, wherein the common mode resonance damping component is selectively triggered based on a feed forward mechanism based on the speed command or speed reference.

19. A method of damping common mode resonance in a power converter, the method comprising:
    generating a plurality of switching control signals according to a desired power inverter output;
    operating a plurality of switching devices of an inverter or rectifier according to the switching control signals to convert DC electrical power to provide output power to a load or to converter AC input power to DC power in the DC link circuit;
    measuring at least one feedback value indicative of one or more electrical conditions at a converter input, a converter DC circuit, or a converter output;
    calculating at least one damping resistance current value associated with a predetermined virtual damping resistance value in parallel with at least one output capacitor based at least partially on a measured output voltage value; and
    selectively modifying at least one of the plurality of switching control signals according to the calculated damping resistance current value;
    wherein generating the plurality of switching control signals comprises:
        providing at least one reference stator current value based at least partially on at least one feedback value and on the at least one setpoint,
        providing at least one output capacitor current value based at least partially on the at least one feedback value and on at least one predetermined output capacitance value, and
        generating at least one offset inverter current value based at least partially on the at least one reference stator current value and the at least one output capacitor current value; and
    wherein selectively modifying at least one of the plurality of switching control signals comprises:
        providing the at least one damping resistance current value based at least partially on the predetermined virtual damping resistance value and on the measured output voltage value,
        generating at least one damping compensated inverter current value based at least partially on the offset inverter current value and the at least one damping resistance current value, and
        generating the switching control signals based at least partially on the at least one feedback value and on the at least one damping compensated inverter current value.

20. The method of claim 19, further comprising selectively triggering the modification of at least one of the plurality of switching control signals based on at least one feedback value.

21. The method of claim 20, further comprising sensing a speed of a motor load coupled to the converter output, or calculating the speed of the motor based on the output voltage feedback; and selectively triggering the modification of at least one of the plurality of switching control signals based on the sensed or calculated motor speed.

22. The method of claim 20, wherein the modification of at least one of the plurality of switching control signals is selectively triggered based on a measured feedback value for at least one of a neutral current, a common mode choke voltage, a common mode component of the capacitor voltage of the converter.

23. The method of claim 20, wherein the modification of at least one of the plurality of switching control signals is selectively triggered based on a feed forward mechanism.

24. A method of damping common mode resonance in a power converter, the method comprising:
    generating a plurality of switching control signals according to a desired power rectifier output;
    operating a plurality of switching devices of an rectifier according to the switching control signals to convert AC electrical power to provide DC power in the DC intermediate circuit;
    measuring at least one feedback value indicative of one or more electrical conditions at a converter input, a converter DC circuit, or a converter output;
    calculating at least one damping resistance current value associated with a predetermined virtual damping resistance value in parallel with at least one input capacitor based at least partially on a measured input voltage value; and
    selectively modifying at least one of the plurality of switching control signals according to the calculated damping resistance current value;
    wherein generating the plurality of switching control signals comprises:
        providing at least one reference stator current value based at least partially on at least one feedback value and on the at least one setpoint,
        providing at least one output capacitor current value based at least partially on the at least one feedback value and on at least one predetermined output capacitance value, and
        generating at least one offset inverter current value based at least partially on the at least one reference stator current value and the at least one output capacitor current value; and
    wherein selectively modifying at least one of the plurality of switching control signals comprises:
        providing the at least one damping resistance current value based at least partially on the predetermined virtual damping resistance value and on the measured input voltage value,
        generating at least one damping compensated rectifier current value based at least partially on the offset rectifier current value and the at least one damping resistance current value, and generating the switching control signals for the rectifier based at least partially on the at least one feedback value and on the at least one damping compensated rectifier current value.

25. A non-transitory computer readable medium with computer-executable instructions for damping common mode resonance in a power converter, the computer readable medium comprising computer-executable instructions for:
generating a plurality of switching control signals according to a desired power converter output;
operating a plurality of switching devices of an inverter according to the switching control signals to convert DC electrical power to provide output power to a load;
measuring at least one feedback value indicative of one or more electrical conditions at a converter input, a converter DC circuit, or a converter output;
calculating at least one damping resistance current value associated with a predetermined virtual damping resistance value in parallel with at least one output or input capacitor based at least partially on a measured output or input voltage value; and
selectively modifying at least one of the plurality of switching control signals according to the calculated damping resistance current value;
wherein the computer-executable instructions for generating the plurality of switching control signals comprises computer-executable instructions for:
providing at least one reference stator current value based at least partially on at least one feedback value and on the at least one setpoint,
providing at least one output capacitor current value based at least partially on the at least one feedback value and on at least one predetermined output capacitance value, and
generating at least one offset inverter current value based at least partially on the at least one reference stator current value and the at least one output capacitor current value; and
wherein the computer-executable instructions for selectively modifying at least one of the plurality of switching control signals comprises computer-executable instructions for:
providing the at least one damping resistance current value based at least partially on the predetermined virtual damping resistance value and on the measured output or input voltage value,
generating at least one damping compensated inverter or rectifier current value based at least partially on the offset inverter current value or inverter current value and the at least one damping resistance current value, and
generating the switching control signals based at least partially on the at least one feedback value and on the at least one damping compensated inverter or rectifier current value.

26. The non-transitory computer readable medium of claim 25, further comprising computer-executable instructions for selectively triggering the modification of at least one of the plurality of switching control signals based on at least one feedback value.

27. A power conversion system, comprising:
an input operative to receive input electrical power;
a DC circuit including at least one storage element;
an output providing output electrical power to a load, the output including at least one output capacitor coupled between the load and an output neutral node, the output neutral node being connected to one of a neutral node of the input and a neutral node of the DC circuit;
an inverter comprising a plurality of switching devices coupled with the DC circuit and the output and operative according to a plurality of switching control signals to selectively convert DC power from the DC circuit to provide the output power to the load;
a feedback system operatively coupled with at least one of the input, the DC circuit, and the output and providing at least one feedback value indicative of one or more electrical conditions at the at least one of the input, the DC circuit, and the output;
a common mode resonance damping component operative according to a trigger signal to selectively calculate at least one damping resistance current value associated with a predetermined virtual damping resistance value in parallel with the at least one output or input capacitor based at least partially on an output or input voltage value obtained from the feedback system;
a trigger component operative to perform a comparison of the at least one feedback value with a predetermined threshold and to selectively enable or disable the common mode resonance damping component according to the comparison;
a switch control system operatively coupled with the feedback system and with the inverter and/or rectifier, the switch control system operative in a first mode when the common mode resonance damping component is enabled to provide the switching control signals to the inverter or rectifier to convert DC power from the DC circuit to provide the output power to the load or convert AC power from the input to DC power in the DC circuit, based at least partially on the at least one feedback value from the feedback system and on the at least one damping resistance current value, and in a second mode when the common mode resonance damping component is disabled to provide the switching control signals to the inverter or rectifier to convert DC power from the DC circuit to provide the output power to the load or convert AC power from the input to DC power in the DC circuit, independent of the at least one damping resistance current value.

28. The power conversion system of claim 27, wherein the trigger component is operative to selectively enable or disable the common mode resonance damping component according to a comparison of the predetermined threshold with a sensed motor speed value from the feedback system.

29. The power conversion system of claim 27, wherein the trigger component is operative to selectively enable or disable the common mode resonance damping component according to a comparison of the predetermined threshold with a calculated motor speed value.

30. The power conversion system of claim 27, wherein the trigger component is operative to selectively enable or disable the common mode resonance damping component according to a comparison of the predetermined threshold with at least one of a neutral current, a common mode choke voltage, or a common mode component of a capacitor voltage.

31. The power conversion system of claim 27, wherein the trigger component is operative to selectively enable or disable the common mode resonance damping component according to a comparison of the predetermined threshold with a feed forward mechanism based on a speed command or speed reference.

* * * * *